United States Patent
Yu et al.

(10) Patent No.: US 11,099,254 B2
(45) Date of Patent: Aug. 24, 2021

(54) ANTI-COLLISION RADAR DEVICE FOR TRAILER CARRIAGE

(71) Applicant: CUB ELECPARTS INC., Fuxing Township, Changhua County (TW)

(72) Inventors: San-Chuan Yu, Fuxing Township, Changhua County (TW); Cheng-Hsin Li, Fuxing Township, Changhua County (TW); Wei-Chang Liang, Fuxing Township, Changhua County (TW)

(73) Assignee: Cub Elecparts Inc., Changhua County (TW)

( * ) Notice: Subject to any disclaimer, the term of this patent is extended or adjusted under 35 U.S.C. 154(b) by 89 days.

(21) Appl. No.: 16/051,769

(22) Filed: Aug. 1, 2018

(65) Prior Publication Data
US 2019/0293750 A1    Sep. 26, 2019

(30) Foreign Application Priority Data
Mar. 26, 2018   (TW) .................. 107110337

(51) Int. Cl.
*G01S 7/03*   (2006.01)
*G01S 13/931*   (2020.01)
*G01S 7/02*   (2006.01)

(52) U.S. Cl.
CPC .............. *G01S 7/03* (2013.01); *G01S 13/931* (2013.01); *G01S 7/027* (2021.05); *G01S 2013/9315* (2020.01); *G01S 2013/93274* (2020.01)

(58) Field of Classification Search
CPC ........... G01S 13/931; G01S 2013/9315; G01S 2013/93274; G01S 2007/027; H01Q 1/12; H01Q 1/22; H01Q 1/27; H01Q 1/32; H01Q 1/3266; H01Q 1/3291; H01Q 1/42
See application file for complete search history.

(56) References Cited

U.S. PATENT DOCUMENTS

| | | | | |
|---|---|---|---|---|
| 5,686,923 | A * | 11/1997 | Schaller | H01Q 19/175 342/352 |
| 5,724,042 | A * | 3/1998 | Komatsu | G01S 7/032 342/175 |
| 6,130,640 | A * | 10/2000 | Uematsu | G01S 7/032 342/175 |
| 6,657,589 | B2 * | 12/2003 | Wang | H01Q 1/3275 342/383 |
| 7,109,938 | B2 * | 9/2006 | Franson | G01S 7/032 343/767 |
| 10,173,623 | B1 * | 1/2019 | Meksavan | G01S 13/931 |
| 2013/0162461 | A1 * | 6/2013 | Lucking | G01S 15/931 342/70 |
| 2018/0004220 | A1 * | 1/2018 | Hazelton | G05D 1/0246 |

* cited by examiner

*Primary Examiner* — Peter M Bythrow
(74) *Attorney, Agent, or Firm* — Muncy, Geissler, Olds & Lowe, P.C.

(57) ABSTRACT

An anti-collision radar device includes a radar mount for fixation to an outer peripheral side of a powerless trailer carriage, and a radar mounted in the radar mount for sensing vehicles coming from left and right sides. The radar mount defines a reference surface. The radar has a sensing surface. The extending direction of the sensing surface is intersected with the extending direction of the reference surface so that a predetermined angle of 30° to 50° is defined therebetween. Thus, the anti-collision radar device can expand the radar sensing range and reduce the visual field blind spot of the driver of the car, thereby ensuring the safety of the car when towing the powerless trailer carriage.

9 Claims, 3 Drawing Sheets

ANTI-COLLISION RADAR DEVICE FOR TRAILER CARRIAGE

BACKGROUND OF THE INVENTION

1. Field of the Invention

The present invention relates to vehicle radar technology and more particularly, to an anti-collision radar device for trailer carriage.

2. Description of the Related Art

In order to satisfy different use requirements, some vehicles will be attached with powerless trailer carriages at the rear side, such as trucks for carrying goods, cars or animals for towing camping RVs, towing cranes for towing broken down vehicles, etc. However, when a car is towing a powerless trailer carriage along the road, the length of the entire vehicle body is increased, the turning radius increases when turning, and the visual dead angle is also different from that of driving an ordinary car. At present, there is no pre-warning protection system that is suitable for the use of the aforementioned trailer carriages. Therefore, it is only possible to rely solely on the driver's experience and techniques to ensure driving safety.

SUMMARY OF THE INVENTION

The present invention has been accomplished under the circumstances in view. It is the main object of the present invention to provide an anti-collision radar device for trailer carriage, which expand the sensing range, ensuring the driving safety of the car that tows the trailer carriage.

To achieve this and other objects of the present invention, an anti-collision radar device comprises a radar mount and a radar. The radar mount defines therein a reference surface. The radar is mounted in the radar mount, comprising a sensing surface. The extending direction of the sensing surface is intersected with the extending direction of the reference surface so that a predetermined angle of 30° to 50° is defined therebetween. This predetermined angle is preferably 43° degrees±3°.

Preferably, the extending direction of the reference surface of the radar mount is parallel to the length direction of the trailer carriage in which the anti-collision radar device is installed.

Preferably, the radar mount comprises a holder shell and a cover plate. The holder shell comprises a mounting portion and a receptacle portion. The mounting portion has the reference surface defined therein. The receptacle portion integrally protrudes from the mount portion in a direction away from the reference surface. The cover plate is affixed to the receptacle portion of the holder shell. The radar is mounted in the receptacle portion of the holder shell and shielded by the cover plate. This convex configuration of the radar mount with a special angle setting of the radar so that the radar can maximize sensing angle to effectively sense the arrival of cars in the rear left and right visual blind spot corners.

Preferably, the radar mount further comprises a reflector mounted in the receptacle portion of the holder shell. The reflector comprises two opposite first side walls and two opposite second side walls. Each first side wall is connected between the two second side walls and located in the extending direction of the sensing surface of the radar. The topmost edge of each first side wall is lower than the sensing surface of the radar. The second side walls are disposed beyond the extending direction of the sensing surface. The topmost edge of each second side wall is higher than the sensing surface of the radar.

Thus, on the one hand, the reflector provides an early warning effect to left and right vehicles entering the blind spot position, on the other hand, the height difference between the first and second side walls of the reflector enables the sensing angle and sensing distance of the radar to be maximized.

Other advantages and features of the present invention will be fully understood by reference to the following specification in conjunction with the accompanying drawings, in which like reference signs denote like components of structure.

DETAILED DESCRIPTION OF THE INVENTION

Figure 1:
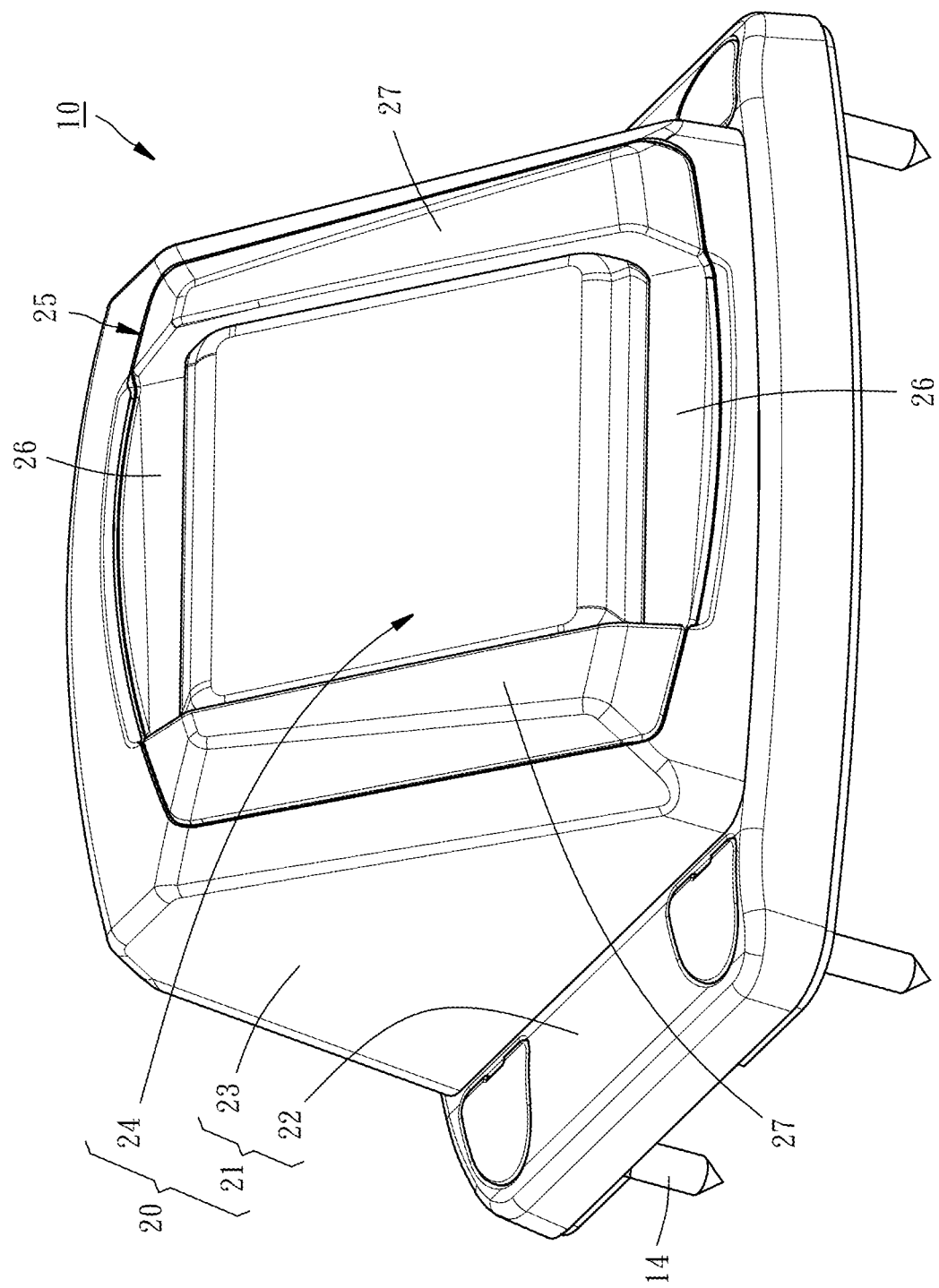
FIG. 1 is an elevational view of an anti-collision radar device in accordance with the present invention.

Referring to FIG. 1, an anti-collision radar device in accordance with the present invention is shown. The anti-collision radar device 10 comprises a radar mount 20 and a radar 30.

The radar mount 20 comprises a holder shell 21 and a cover plate 24. The holder shell 21 comprises a mounting portion 22 and a receptacle portion 23. The mounting portion 22 defines a reference surface P1 on an inner side thereof (see FIG. 2). The receptacle portion 23 integrally protrudes from an opposing outer side of the mounting portion 22 in direction away from the reference surface P1. The cover plate 24 is affixed to the receptacle portion 23 of the holder shell 21 and exposed to the outside.

The radar 30 is mounted in the receptacle portion 23 of the holder shell 21 of the radar mount 20 and shielded by the cover plate 24 to get protection. The radar 30 comprises a sensing surface P2 (see FIG. 2). The extending direction of the sensing surface P2 of the radar 30 intersects with the extending direction of the reference surface P1 of the radar mount 20 so that a predetermined angle θ of 30° to 50° is formed therebetween. Preferably, this predetermined angle θ is 43°±3° that can make the radar get the best protection.

Figure 3:
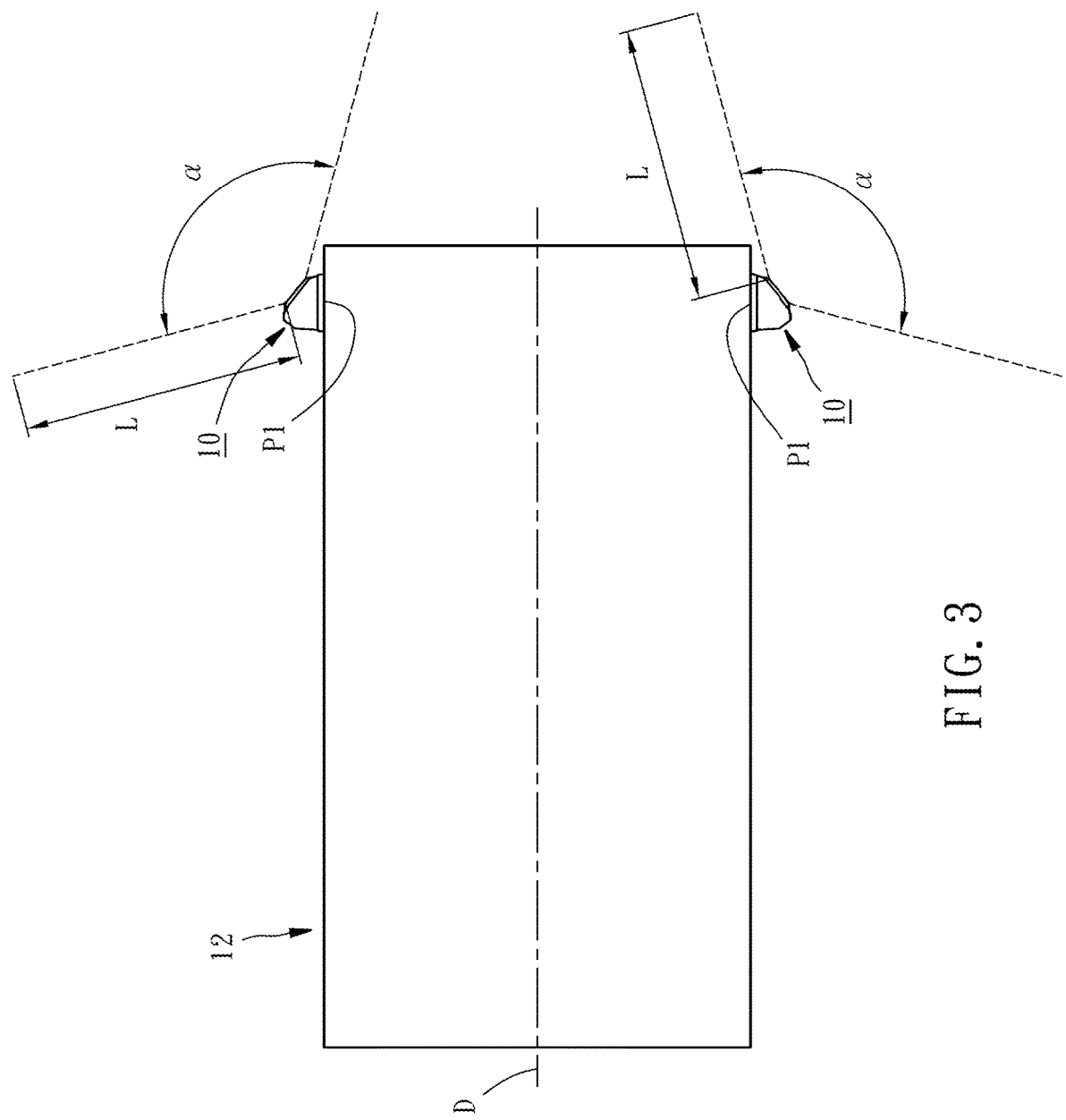
FIG. 3 is a schematic top view illustrating the anti-collision radar device installed in a trailer-mounted vehicle.

When using the present invention in a trailer carriage 12 (that is a kind of powerless road vehicle to be dragged by an automobile), as illustrated in FIG. 3, two anti-collision radar devices 10 are respectively installed in opposing left and right sides of the rear end of the trailer carriage 12. More specifically, the mounting portion 22 of the holder shell 21 of the radar mount 20 of each anti-collision radar device 10 is affixed to the outer peripheral surface of the rear end of the trailer carriage 12 by means of four screw bolts 14 (as shown in FIG. 1) to keep the extending direction of the reference surface P1 of the radar mount 20 in parallel to the length direction D of the trailer carriage 12.

The radar mount 20 further comprises a reflector 25 mounted in the receptacle portion 23 of the holder shell 21. The reflector 25 comprises two opposite first side walls 26 and two opposite second side walls 27, and each first side wall 26 is connected between the two second side walls 27 so that the reflector 25 surrounds the radar 30. As shown in FIG. 3, the first side walls 26 of the reflector 25 are located in the extending direction of the sensing surface P2 of the radar 30, and the topmost edge of each first side wall 26 of the reflector 25 is not higher than the sensing surface P2 of the radar 30; the second side walls 27 of the reflector 25 are disposed beyond the extending direction of the sensing surface P2 of the radar 30, and the topmost edge of each second side wall 27 of the reflector 25 is higher than the sensing surface P2 of the radar 30.

Figure 2:
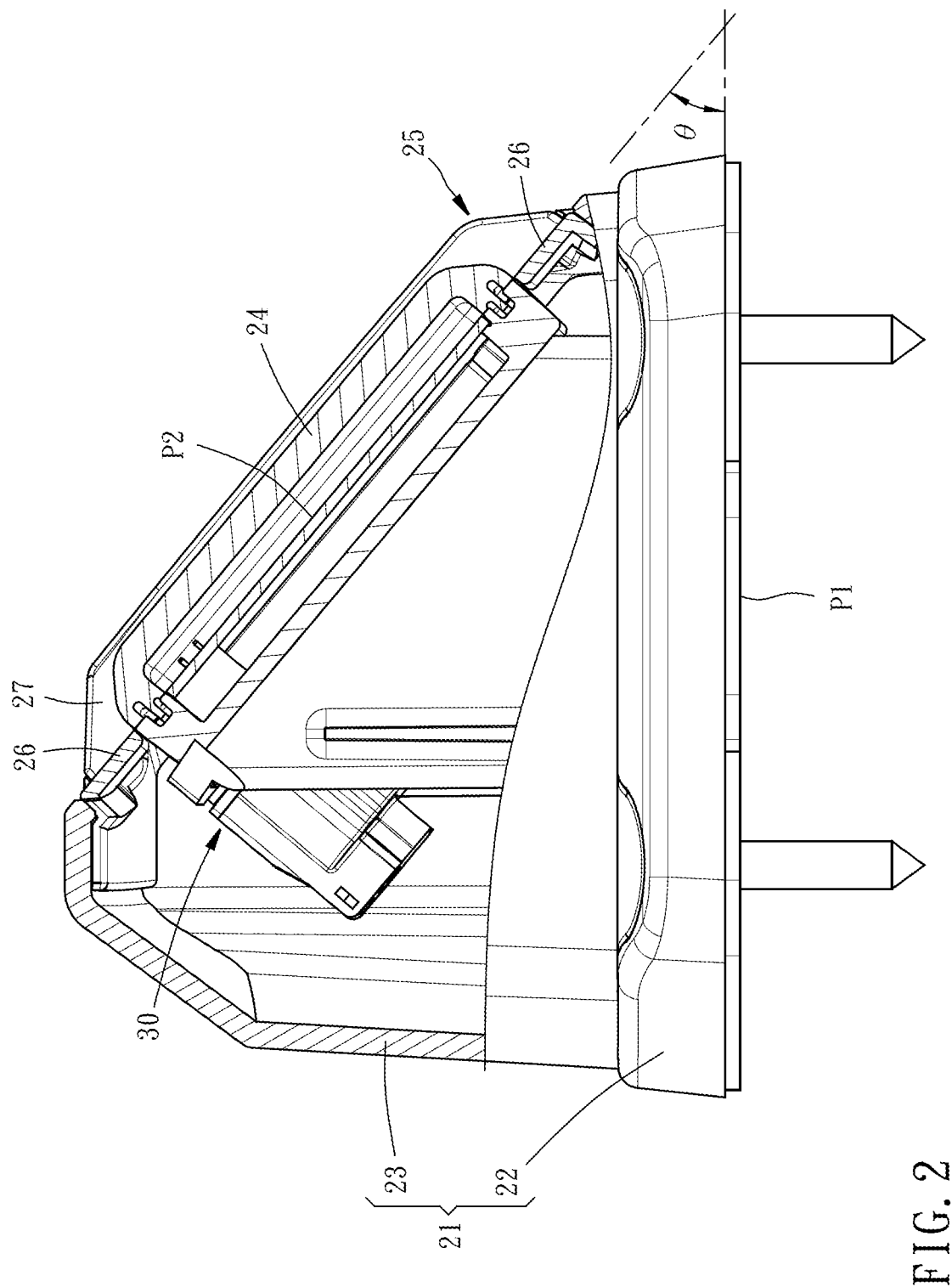
FIG. 2 is a sectional view of a part of the anti-collision radar device in accordance with the present invention.

From the above, it can be seen that the present invention utilizes the convex configuration of the radar mount 20 with a special angle setting of the radar 30 so that the sensing range of the radar 30 can be maximized. Further, as shown in FIGS. 2 and 3, the present invention utilizes the reflector 25 to provide an early warning effect to left and right vehicles entering the blind spot position, and further utilizes the height difference between the first and second side walls 26 and 27 of the reflector 25 to increase the sensing angle α of the radar 30 (the sensing angle can be as large as 120 degrees) and sensing distance L (up to 40 meters), which can guarantee the safety of the trailer vehicle 12 when it is towed by an ordinary motor vehicle.

What is claimed is:

1. An anti-collision radar device for trailer carriage, comprising:
   a radar mount defining therein a reference surface; and
   a radar mounted in said radar mount, said radar comprising a sensing surface, the extending direction of said sensing surface being intersected with the extending direction of said reference surface so that a predetermined angle of 30° to 50° is defined therebetween;
   wherein both said radar mount and said radar are completely on the same side of the reference surface;
   wherein said radar mount comprises a holder shell, said holder shell comprising a mounting portion and a receptacle portion, said mounting portion having said reference surface defined therein, said receptacle portion integrally protruding from said mount portion in a direction upward from said reference surface, said radar is mounted in said receptacle portion of said holder shell.

2. The anti-collision radar device for trailer carriage as claimed in claim 1, wherein said predetermined angle is preferably 43° degrees 3°.

3. The anti-collision radar device for trailer carriage as claimed in claim 1, wherein said trailer carriage includes a left side and a right side, said anti-collision radar device is installed on one of the left and right sides of the trailer carriage and the extending direction of said reference surface of said radar mount is parallel to the length direction of the trailer carriage in which said anti-collision radar device is installed.

4. The anti-collision radar device for trailer carriage as claimed in claim 2, wherein said trailer carriage includes a left side and a right side, said anti-collision radar device is installed on one of the left and right sides of the trailer carriage and the extending direction of said reference surface of said radar mount is parallel to the length direction of the trailer carriage in which said anti-collision radar device is installed.

5. The anti-collision radar device for trailer carriage as claimed in claim 3, wherein said radar mount comprises a cover plate, said cover plate being affixed to said receptacle portion of said holder shell; said radar is shielded by said cover plate.

6. The anti-collision radar device for trailer carriage as claimed in claim 5, wherein said radar mount further comprises a reflector mounted in said receptacle portion of said holder shell, said reflector comprising two opposite first side walls and two opposite second side walls, each said first side wall being connected between said two second side walls, each said first side wall being located in the extending direction of said sensing surface of said radar, and the topmost edge of each said first side wall being lower than said sensing surface of said radar, said second side walls being disposed beyond the extending direction of said sensing surface, the topmost edge of each said second side wall being higher than said sensing surface of said radar.

7. The anti-collision radar device for trailer carriage as claimed in claim 6, wherein the height of the second side wall is greater than the first side wall.

8. The anti-collision radar device for trailer carriage as claimed in claim 6, wherein the height of the second side wall is greater than the sensing surface of the radar.

9. The anti-collision radar device for trailer carriage as claimed in claim 5, wherein the cover plate is parallel to the sensing surface of the radar.

* * * * *